(12) United States Patent
Thomsen

(10) Patent No.: US 7,649,439 B2
(45) Date of Patent: *Jan. 19, 2010

(54) FLEXIBLE THIN METAL FILM THERMAL SENSING SYSTEM

(75) Inventor: Donald L. Thomsen, Yorktown, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 253 days.

This patent is subject to a terminal disclaimer.

(21) Appl. No.: 11/465,503

(22) Filed: Aug. 18, 2006

(65) Prior Publication Data

US 2008/0043811 A1    Feb. 21, 2008

(51) Int. Cl.
*H01C 3/04* (2006.01)
(52) U.S. Cl. .................... 338/25; 338/22 R; 428/672
(58) Field of Classification Search ............ 338/20–25; 428/672, 673, 607, 333, 457
See application file for complete search history.

(56) References Cited

U.S. PATENT DOCUMENTS

| | | | |
|---|---|---|---|
| 3,601,693 A * | 8/1971 | Lorentzen | 324/444 |
| 4,078,096 A | 3/1978 | Redmon et al. | |
| 5,082,734 A * | 1/1992 | Vaughn | 428/411.1 |
| 5,869,130 A | 2/1999 | Ferrier | |
| 6,019,926 A | 2/2000 | Southward et al. | |
| 6,294,220 B1 | 9/2001 | McGrath et al. | |
| 6,589,593 B1 | 7/2003 | Hupe et al. | |
| 6,746,751 B2 | 6/2004 | Lamotte et al. | |
| 6,815,326 B2 | 11/2004 | Asai et al. | |
| 6,958,308 B2 | 10/2005 | Brown | |
| 2005/0119390 A1 * | 6/2005 | Gaddy et al. | 524/440 |
| 2005/0233154 A1 * | 10/2005 | Miner et al. | 428/425.9 |

* cited by examiner

*Primary Examiner*—Kyung Lee
(74) *Attorney, Agent, or Firm*—Helen M. Galus

(57) ABSTRACT

A flexible thin metal film thermal sensing system is provided. A self-metallized polymeric film has a polymeric film region and a metal surface disposed thereon. A layer of electrically-conductive metal is deposited directly onto the self-metallized polymeric film's metal surface. Coupled to at least one of the metal surface and the layer of electrically-conductive metal is a device/system for measuring an electrical characteristic associated therewith as an indication of temperature.

18 Claims, 1 Drawing Sheet

US 7,649,439 B2

FLEXIBLE THIN METAL FILM THERMAL SENSING SYSTEM

ORIGIN OF THE INVENTION

The invention was made by an employee of the United States Government and may be manufactured and used by or for the Government of the United States of America for governmental purposes without the payment of any royalties thereon or therefor.

BACKGROUND OF THE INVENTION

1. Field of the Invention

This invention relates to thin metal films. More specifically, the invention is a flexible thin metal film thermal sensing system.

2. Description of the Related Art

Electrically-based thermal sensing is typically accomplished using a thermocouple or resistance temperature device (RTD). A thermocouple is a passive device made out of wire or a metal film deposited on an insulative substrate. Wire thermocouples are relatively inflexible thereby making them a poor choice when the sensor must be wrapped about or otherwise conformed to the shape of a structure. Metal film-based thermocouples are typically made by thermal evaporation or sputtering of a metal film onto a dielectric surface, e.g., a plastic. If this sensor is to be mounted on a structural surface for temperature measurement thereof, the dielectric surface must be (i) doped to make it thermally conductive, and (ii) pre-shaped to fit the portion of the structural surface on which it is to be mounted.

RTDs are active devices in that an electric current must be supplied thereto with a resulting electrical resistance being read therefrom. The electrical resistance is indicative of temperature. RTDs are typically made from metal foils that are thicker and less flexible than a metal film thermocouple. Accordingly, RTDs may not be suitable choices for temperature sensing applications requiring relatively small and flexible temperature sensors.

SUMMARY OF THE INVENTION

Accordingly, it is an object of the present invention to provide a flexible thin metal film thermal sensing system.

Another object of the present invention is to provide a flexible thin metal film thermal sensing system adaptable for operation as a passive thermocouple or an active RTD.

Other objects and advantages of the present invention will become more obvious hereinafter in the specification and drawings.

In accordance with the present invention, a flexible thin metal film thermal sensing system uses a self-metallized polymeric film having a polymeric film region and a metal surface disposed on the polymeric film region. A layer of an electrically-conductive metal is deposited directly onto the metal surface of the self-metallized polymeric film. Operatively coupled to at least one of the metal surface and the layer of electrically-conductive metal is a device/system for measuring an electrical characteristic associated therewith as an indication of temperature.

DETAILED DESCRIPTION OF THE INVENTION

Figure 1:
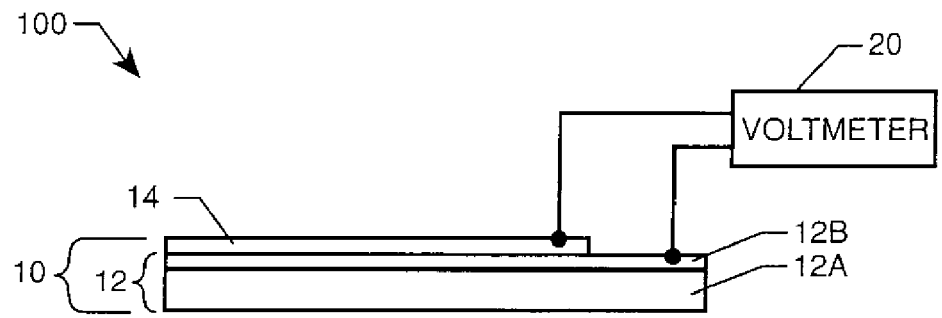
FIG. 1 is a schematic view of a flexible thin metal film thermal sensing system in accordance with an embodiment of the present invention.

Referring now to the drawings, and more particularly to FIG. 1, an embodiment of a flexible thin metal film thermal sensing system is shown and is referenced generally by numeral 100. Thermal system 100 is a passive thermoelectric device in that it requires no applied excitation voltage or current. Thermal system 100 is based on a flexible thin metal film system 10 previously disclosed in U.S. patent application Ser. No. 11/279,009, filed Apr. 7, 2006, the contents of which are hereby incorporated by reference. Flexible thin metal film system 10 obtains its flexibility from a self-metallized polymeric film base 12 that, in general, has an underlying sheet 12A of polymeric material with a surface layer 12B that is a conductive metal. In general, the structure of self-metallized polymeric film 12 is created/developed in one or more processing stages. Conventional two-stage processing involves preparing/fabricating polymer sheet 12A and then depositing surface layer 12B onto sheet 12A. However, absent a pretreatment process, there will be adhesion problems between sheet 12A and surface layer 12B.

The adhesion between sheet 12A and metal surface layer 12B is greatly improved if self-metallized polymeric film 12 is created/developed by single-stage processing of, for example, a homogenous solution of a native metal precursor (as a positive valent metal complex) and a selected poly(amic acid) precursor of the final polymer. Single-stage thermal or light processing simultaneously causes the polymer to form while most of the metal atoms aggregate at the surface of the polymer in a very thin layer on the order of about 500-2000 Angstroms (Å) in thickness. Such single-stage processing is disclosed by R. E. Southward et al., in "Inverse CVD: A Novel Synthetic Approach to Metallized Polymeric Films," Advanced Materials, 1999, 11, No. 12, pp 1043-1047, the contents of which are hereby incorporated by reference as if set forth in its entirety.

The resulting self-metallized polymeric film 12 is flexible and does not suffer from the aforementioned adhesion problems. As a result of such single-stage processing, underlying sheet 12A retains some of the metal atoms (i.e., the same metal forming surface layer 12B) so that underlying sheet 12A possesses thermal conductivity while metal surface layer 12B is electrically conductive. Accordingly, as will be readily apparent from the ensuing description, underlying sheet 12A can be coupled to a structural surface (not shown) when the temperature thereof is to be measured. Further, since thin metal film system 10 is flexible, it can be easily conformed to the shape of the structural surface.

Flexible thin metal film system 10 further includes a layer 14 (or multiple layers) of electrically conductive metal directly deposited onto surface layer 12B. Further, in at least one embodiment of the present invention, metal layer 14 is deposited directly onto surface layer 12B without any adhesion pretreatment of layer 12B. Additionally, in at least one embodiment, metal layer 14 can comprise multiple sub-layers, wherein the first sub-layer is directly deposited onto the surface layer 12B, and each sub-layer may comprise the same or different electrically conductive metals.

In other words, surface layer 12B serves as a strike layer for metal layer 14 that is deposited onto surface layer 12B by one of a variety of electrodeposition methods to include electroplating. However, it is to be understood that layer 14 could also be deposited directly onto surface layer 12B by means of a variety of electroless deposition/plating techniques without departing from the scope of the present invention. For a description of electroless plating techniques, see Chapter 17 of "Electroplating" by Frederick A. Lowenheim, McGraw-Hill Book Company, New York, 1978. Still other techniques for depositing metal layer 14 include, for example, immersion or displacement plating, chemical reduction deposition such as silvering, thermal evaporation, sputtering and chemical vapor deposition. Thin metal film systems fabricated in this fashion are typically on the order of 0.05 to 1 micron in thickness. By comparison, metal foil RTDs are considerably thicker, i.e., typically 4-50 microns in thickness.

As shown in FIG. 1, coupled to flexible thin metal film system 10 is a voltmeter 20. More specifically, as shown, voltmeter 20 has its leads 22 coupled to metal surface layer 12B and metal layer 14 where the choice of either as an anode or cathode is not a limitation of the present invention. A voltage difference measured by voltmeter 20 is indicative of temperature experienced by thin metal film system 10. Thermal system 100 can be calibrated by measuring voltages (i.e., the Seebeck voltage) at known temperature intervals with the recorded voltages and known temperatures being used to determine the equation of a line with the slope thereof being the Seebeck Coefficient.

Figure 2:
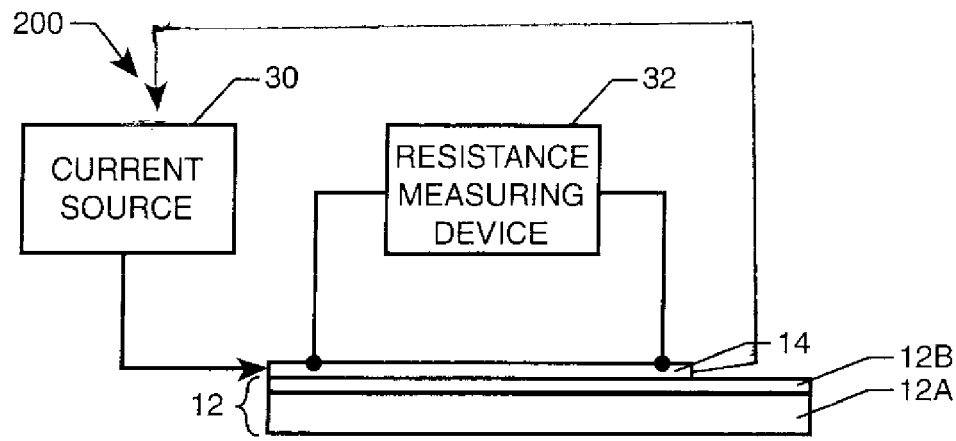
FIG. 2 is a schematic view of a flexible thin metal film thermal sensing system in accordance with another embodiment of the present invention.
Figure 3:
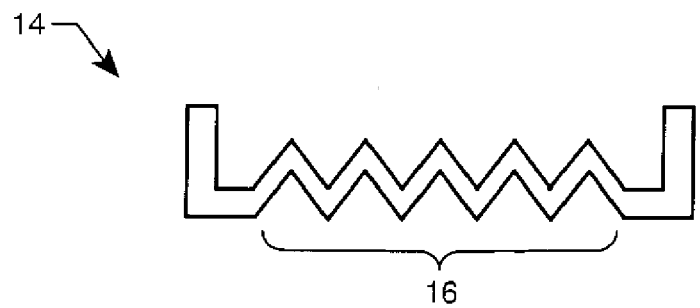
FIG. 3 is plan view of an example of a patterned metal layer forming an electrical resistance element.

The present invention can also be adapted/configured to function as an active resistance temperature device (RTD) as will now be explained with the aid of FIGS. 2 and 3. In FIG. 2, a flexible thin metal film thermal sensing system 200 utilizes a flexible thin metal film system similar to that described above. The difference is that metal layer 14 is shaped, formed or etched to define a pattern 16 (FIG. 3) that exhibits changes in electrical resistance in correspondence with changes in temperature. In operation of thermal sensing system 200, electric current is supplied to metal layer 14 by a current source 30 while the electrical resistance of pattern 16 is measured by a resistance measuring device 32 electrically coupled across pattern 16.

The advantages of the present invention are numerous. The flexible thin metal film thermal sensing systems of the present invention overcome the comparatively inflexible prior art thermocouples and RTDs. In addition, since the underlying polymeric sheet is thermally conductive, these thermal sensing systems are well suited to sense temperatures of structures to which they are coupled as they do not require doping with thermally conductive materials.

The present invention can be made using a variety of self-metallized polymeric films. Referring again to FIGS. 1 and 2, metal surface layer 12B of self-metallized polymeric film 12 as well as metal layer 14 can be selected from the group of metals to include palladium, platinum, gold, silver, nickel, copper, tantalum, tin, lead, and mercury. Alloys of these metals could also be used. Furthermore, the metal for surface layer 12B need not be the same as the metal used for metal layer (or multiple layers) 14.

Althouqh the invention has been described relative to specific embodiments thereof, there are numerous variations and modifications that will be readily apparent to those skilled in the art in light of the above teachings. For example, while the present invention has been described with respect to electroplating and electroless plating fabrication techniques and materials associated therewith, the present invention is not so limited. Other metals and associated fabrication techniques (e.g., thermal evaporation, sputtering, etc.) could also be used to construct thermal sensing systems in accordance with the present invention. These alternative fabrication methods could be used to deposit pure metals such as iron, copper, nickel, manganese, aluminum, silicon, platinum, rhodium and chromium, as well as alloys thereof such as constantan (55% copper, 45% nickel), alumel (95% nickel, 2% manganese, 2% aluminum, 1% silicon), chromel (90% nickel, 10% chromium) and nichrome (80% nickel, 20% chromium). Additionally, FIG. 3 shows one example of a pattern 16 that exhibits changes in electrical resistance in correspondence with changes in temperature, other such patterns are within the scope of the present invention. It is therefore to be understood that, within the scope of the appended claims, the invention may be practiced other than as specifically described.

What is claimed as new and desired to be secured by Letters Patent of the United States is:

1. A flexible thin metal film thermal sensing system, comprising:
    a self-metallized polymeric film developed from single-stage processing of a homogeneous solution of a native metal precursor and a poly(amic acid) precursor to thereby form a thermally-conductive polymeric film region and a continuous metal surface disposed on said polymeric film region;
    at least one layer of electrically-conductive metal deposited directly onto said metal surface: and
    means coupled to at least one of said metal surface and said at least one layer for measuring an electrical characteristic associated therewith as an indication of temperature.

2. A flexible thin metal film thermal sensing system as in claim 1 wherein said metal surface comprises a metal selected from the group consisting of palladium, platinum, gold, silver, nickel, copper. tantalum, tin, lead, mercury, and alloys thereof.

3. A flexible thin metal film thermal sensing system as in claim 1 wherein said at least one layer is selected from the group consisting of palladium, platinum, gold, silver, nickel, copper, tantalum, tin, lead, mercury, iron, manganese, aluminum, silicon, rhodium, chromium, and alloys thereof.

4. A flexible thin metal film thermal sensing system as in claim 1 wherein said at least one layer comprises at least two sub-layers, each sub-layer being selected from the group consisting of palladium, platinum, gold, silver, nickel, copper, tantalum, tin, lead. mercury, iron, manganese, aluminum, silicon, rhodium, chromium, and alloys thereof.

5. A flexible thin metal film thermal sensing system as in claim 1 wherein said means comprises a voltage measuring device coupled to said metal surface and said at least one layer.

6. A flexible thin metal film thermal sensing system as in claim 1 wherein said at least one layer is shaped to define an electrically resistive pattern, and wherein said means comprises:
    an electrical source for supplying a current to said pattern; and
    a resistance measuring device coupled to said pattern.

7. A flexible thin metal film thermal sensing system, comprising:
    a self-metallized polymeric film developed from single-stage processing of a homogeneous solution of a native metal precursor and a poly(amic acid) precursor to thereby form a thermally-conductive polymeric film region with atoms of a metal distributed therein and further having a surface region disposed on said polymeric film region. said surface region being composed of a thickness of said metal, said polymeric film region adapted to be coupled to a structure's surface;

a layer of electrically-conductive material deposited directly onto said surface wherein a sensing device is formed by said self-metallized polymeric film with said layer deposited thereon; and a device coupled to at least one of said surface region and said layer for measuring an electrical characteristic associated therewith as an indication of temperature of the structure's surface, upon said sensing device being coupled to the structure's surface.

8. A flexible thin metal film thermal sensing system as in claim 7 wherein said metal is selected from the group consisting of palladium, platinum, gold, silver, nickel, copper. tantalum, tin, lead. mercury, and alloys thereof.

9. A flexible thin metal film thermal sensing system as in claim 7 wherein said layer is selected from the group consisting of palladium, platinum, gold, silver, nickel, copper, tantalum, tin, lead, mercury, iron, manganese, aluminum, silicon, rhodium, chromium. and alloys thereof.

10. A flexible thin metal film thermal sensing system as in claim 7 wherein said layer comprises at least two sub-layers, each sub-layer being selected from the group consisting of palladium, platinum, gold, silver, nickel, copper, tantalum, tin, lead, mercury, iron, manganese, aluminum, silicon, rhodium, chromium, and alloys thereof.

11. A flexible thin metal film thermal sensing system as in claim 7 wherein said device comprises a voltage measuring device coupled to said surface region and said layer.

12. A flexible thin metal film thermal sensing system as in claim 7 wherein said layer is shaped to define an electrically resistive pattern, and wherein said device comprises:

an electrical source for supplying a current to said pattern; and a resistance measuring device coupled to said pattern.

13. A flexible thin metal film thermal sensing system, comprising:

a self-metallized polymeric film having a thermally-conductive polymeric film region and a continuous metal surface disposed on said polymeric film region with said metal surface being developed during single-stage processing of a homogenous solution of a native metal precursor and a poly(amic acid) precursor;

a layer of electrically-conductive metal deposited directly onto said metal surface; and means coupled to at least one of said metal surface and said layer for measuring an electrical characteristic associated therewith as an indication of temperature.

14. A flexible thin metal film thermal sensing system as in claim 13 wherein said metal surface comprises a metal selected from the group consisting of palladium. platinum, gold, silver, nickel, copper, tantalum, tin, lead, mercury, and alloys thereof.

15. A flexible thin metal film thermal sensing system as in claim 13 wherein said layer is selected from the group consisting of palladium, platinum, gold, silver, nickel, copper, tantalum, tin, lead, mercury, iron, manganese. aluminum, silicon, rhodium, chromium, and alloys thereof.

16. A flexible thin metal film thermal sensing system as in claim 13 wherein said means comprises a voltage measuring device coupled to said metal surface and said layer.

17. A flexible thin metal film thermal sensing system as in claim 13 wherein said layer is shaped to define an electrically resistive pattern, and wherein said means comprises:

an electrical source for supplying a current to said pattern; and a resistance measuring device coupled to said pattern.

18. A flexible thin metal film thermal sensing system as in claim 13 wherein said layer comprises at least two sub-layers, each sub-layer being selected from the group consisting of palladium, platinum, gold, silver, nickel, copper, tantalum, tin, lead, mercury, iron, manganese, aluminum, silicon, rhodium, chromium, and alloys thereof.

* * * * *